March 15, 1938.                L. E. QUANDT ET AL                2,111,298
                                 LIQUID FLOW GAUGE
                                Filed Sept. 8, 1936
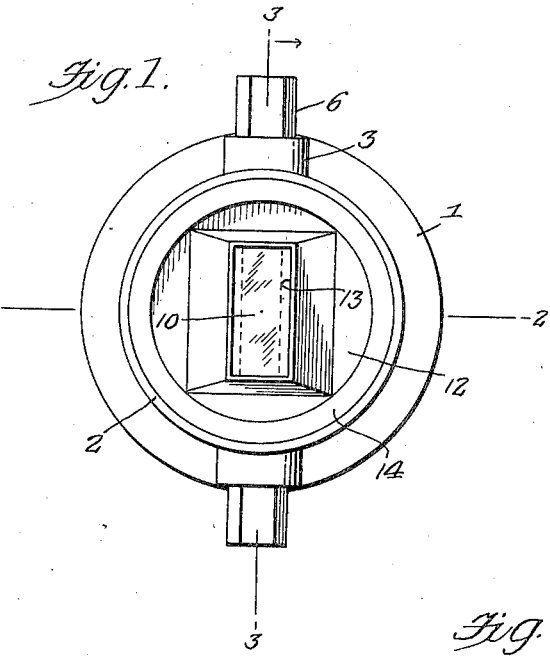
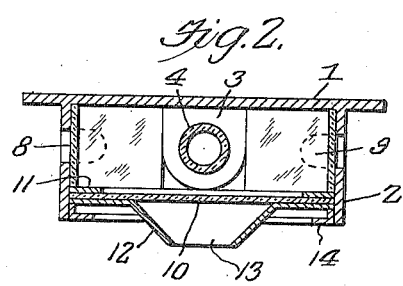
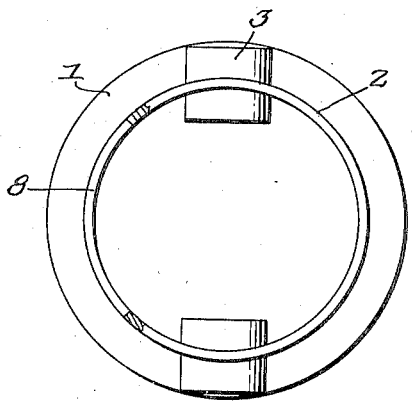
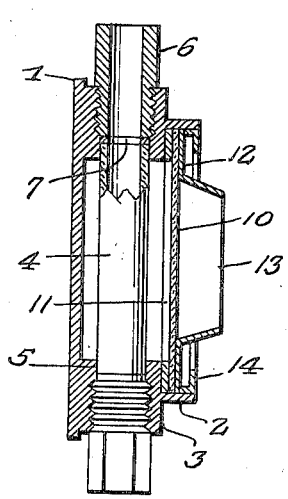
Inventors
Lloyd E. Quandt,
Clifton Lanehart,
By John Patten Duffie
                    Attorney Patented Mar. 15, 1938

2,111,298

UNITED STATES PATENT OFFICE 2,111,298

LIQUID FLOW GAUGE

Lloyd E. Quandt and Clifton Lanehart,
Baltimore, Md.

Application September 8, 1936, Serial No. 99,854

3 Claims. (Cl. 116—117)

This invention relates to new and useful improvements in liquid flow gauges.

The primary object of my invention is to provide a liquid flow gauge which may be used to advantage in determining the proper flow of liquid through the pipe line, or in detecting the presence of air bubbles or foreign matter in the liquid.

In the accompanying drawing, which is for illustrative purposes only and is therefore not drawn to scale:

Figure 1 is a face view of a liquid flow gauge, embodying my improvements.

Figure 2 is a horizontal section, taken on line 2—2 of Figure 1.

Figure 3 is a vertical transverse section, taken on line 3—3 of Figure 1, and Figure 4 is a detail face view of the casting.

Referring to the drawing for a more particular description of our invention, the device comprises a circular casting 1, formed on its front face with the annular flange or ring 2, and with the hollow interiorly threaded bosses 3, which are preferably disposed in vertical alinement and at diametrically opposite points.

A glass sight tube 4 is arranged with its opposite ends extending into the smooth inner end portions 5 of the hollow bosses 3, and is held in position by the threaded bushings 6, which screw into the outer ends of said bosses against the gaskets 7. The gaskets 7 fit against opposite ends of the sight tube and form air and water tight connections at these points.

In carrying out my invention, the annular flange or ring 2 of the casting 1, is formed in opposite side portions with the arcuate slots or windows 8 to permit the entrance of light and these slots or windows are covered by the transparent pyralin strips 9, which fit against the inner wall of the flange or ring over the windows.

A transparent glass disc 10 is mounted in the annular flange or ring 2, in front of the sight tube 4 and fits against the paper gasket 11. A metal shield 12 with a central vertical opening 13, also fits in the flange or ring 2 over the glass disc 10 and is held in place by the ordinary snap ring 14.

From the foregoing description taken in connection with the drawing, it is thought that the construction, operation and advantages of my invention will be readily understood without requiring a more extended explanation.

Having described my invention, what I claim as new and desire to secure by Letters Patent, is:

1. In a liquid flow gauge of the character specified, a circular casting formed on its front face with an annular flange or ring provided in opposite side portions with slots or windows, hollow interiorly threaded bosses disposed at diametrically opposite points on the front face of the casting, a glass sight tube arranged with its ends extending into the inner adjacent ends of the hollow bosses, gaskets fitting in the inner ends of the bosses over the corresponding ends of the sight tube and threaded bushings screwing into the outer ends of the bosses against the corresponding gaskets.

2. In a liquid flow gauge of the character specified, a circular casting formed on its front face with an annular flange or ring provided in opposite sides with slots or windows, hollow interiorly threaded bosses disposed at diametrically opposite points on the front face of the casting, a glass sight tube arranged with its ends extending into the inner adjacent ends of the hollow bosses, gaskets fitting in the inner ends of the bosses over the corresponding ends of the sight tube, threaded bushings screwing into the outer ends of the bosses against the corresponding gaskets and a glass face or cover for the sight tube.

3. In a liquid flow gauge of the character specified, a circular casting provided on its front face with an annular flange or ring and at diametrically opposite points with hollow cylindrical bosses, said flange or ring having vertical slots or windows in opposite side portions and said hollow bosses formed with interiorly threaded outer end portions and smooth inner end portions, a glass sight tube arranged with its ends extending into the smooth inner end portions of the hollow bosses, gaskets fitting in the smooth inner end portions of the hollow bosses against opposite ends of the sight tube, threaded bushings screwing into the outer end portions of the bosses against the corresponding gaskets and a glass face or window mounted over the sight tube.

LLOYD E. QUANDT.
CLIFTON LANEHART.